(12) United States Patent
Arntz et al.

(10) Patent No.: US 6,674,051 B2
(45) Date of Patent: Jan. 6, 2004

(54) HEATER CLOAKING GRILL GRATE SYSTEM FOR DOWNDRAFT COOKING APPLIANCE

(75) Inventors: Timothy J. Arntz, Cleveland, TN (US); S. Todd Brooks, Cleveland, TN (US); Mark A. Pickering, Cleveland, TN (US)

(73) Assignee: Maytag Corporation, Newton, IA (US)

( * ) Notice: Subject to any disclaimer, the term of this patent is extended or adjusted under 35 U.S.C. 154(b) by 49 days.

(21) Appl. No.: 10/014,422

(22) Filed: Dec. 14, 2001

(65) Prior Publication Data

US 2003/0111456 A1 Jun. 19, 2003

(51) Int. Cl.⁷ .............................. H05B 3/68; A47J 31/12
(52) U.S. Cl. ................... 219/450.1; 219/465.1; 99/339
(58) Field of Search ........................ 219/443.1, 449.1, 219/450.1, 451.1, 465.1, 468.1, 468.2; 99/331, 339, 422, 444, 445

(56) References Cited

U.S. PATENT DOCUMENTS

| | | | |
|---|---|---|---|
| 1,644,255 A | * | 10/1927 | Kercher et al. .......... 219/468.2 |
| 2,093,939 A | | 9/1937 | Strack |
| 3,069,526 A | | 12/1962 | Bremer et al. |
| 3,235,709 A | | 2/1966 | Fischer |
| 3,797,375 A | * | 3/1974 | Cerola .......................... 99/340 |
| 4,917,006 A | * | 4/1990 | Bowen et al. ................. 99/331 |
| 5,036,180 A | | 7/1991 | Scott |
| 5,742,031 A | * | 4/1998 | Kelly et al. ............... 219/446.1 |
| RE36,464 E | | 12/1999 | O'Brien et al. |

* cited by examiner

Primary Examiner—Sang Y. Paik
(74) Attorney, Agent, or Firm—Diederiks & Whitelaw, PLC

(57) ABSTRACT

A cooking appliance includes a grilling grate supported directly above at least one heating element and situated adjacent to a downdraft grill. The grilling grate includes structure to effectively shield the heating element(s) from an air flow generated during operation of the downdraft system. More specifically, the grilling grate includes a grilling surface on an upper side, and a plurality of conductive heat members on a lower side. The conductive heat members have side portions which extend about the heating element in order to cloak the heating element from the effects of the airflow produced by the downdraft system thereby providing a more efficient means of energy transfer to the grilling surface.

20 Claims, 2 Drawing Sheets

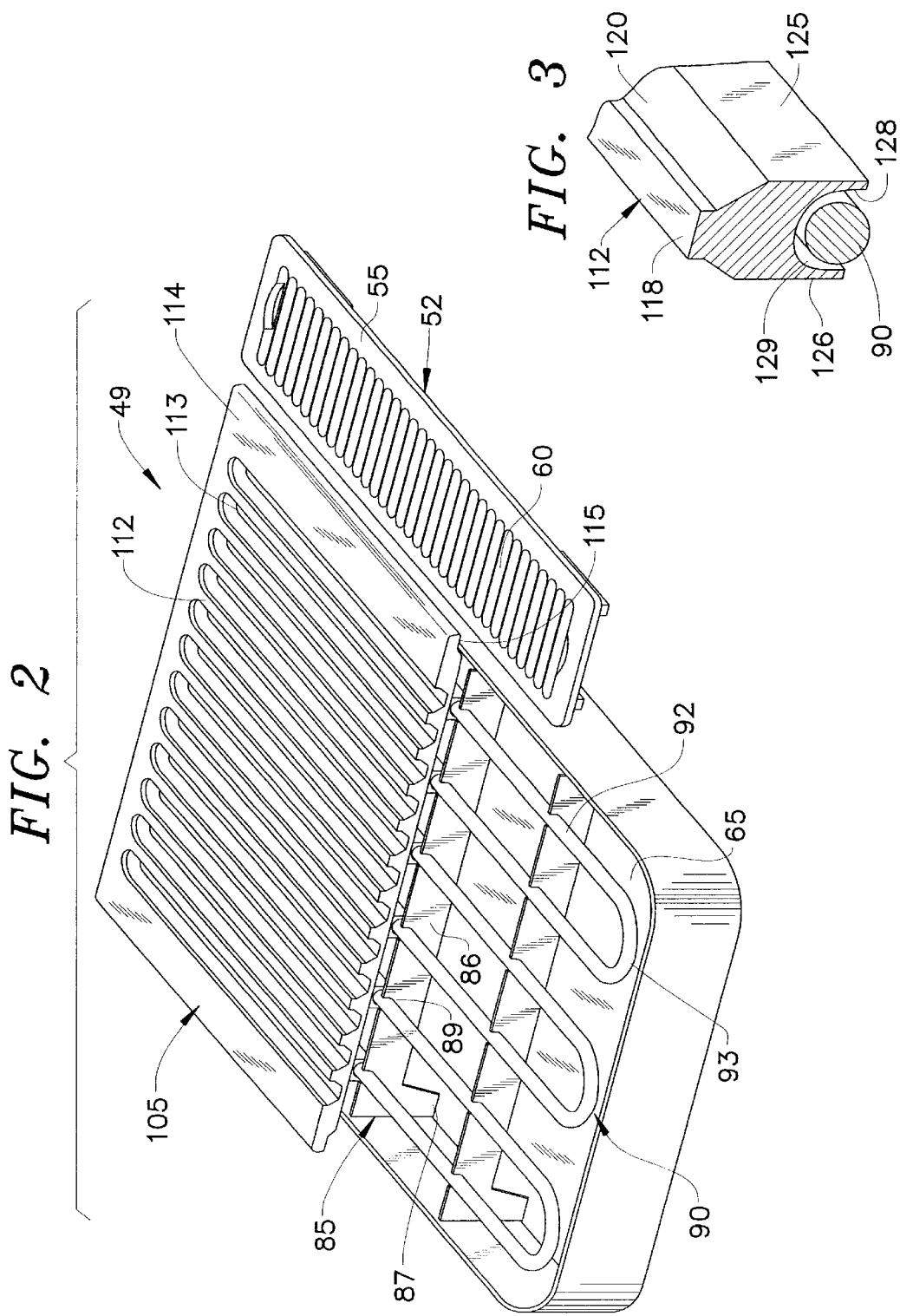

HEATER CLOAKING GRILL GRATE SYSTEM FOR DOWNDRAFT COOKING APPLIANCE

BACKGROUND OF THE INVENTION

1. Field of the Invention

The present invention pertains to the art of cooking appliances and, more particularly, to a cooking appliance including a downdraft system and a grilling unit including a grilling surface and a plurality of support members which serve to shield an electric resistive-type heating element from airflow currents created by operation of the downdraft system.

2. Discussion of the Prior Art

In the art of cooking appliances, it is known to utilize a grilling surface supported above heating elements for the purpose of cooking various foodstuffs, for example: steak, fish, vegetables and the like. Over the course of time, several problems have been identified in connection with the operation of such grills. For instance, fats and oils dripping from the cooked foods can damage the heating coil and, in addition, produce quantities of smoke, grease and other airborne by-products which contaminate the cooking area.

The need to protect the heating elements in an electric grill is recognized in the prior art, at least with respect to portable electric grilling units. Inventors have developed several techniques to address these problems. For example, U.S. Reissue Pat. No. 36,464 addresses certain problems associated with fats and oils dripping onto the burner elements in portable grills. The griller is described as having a channel formed on the underside of a grill member to shield lower heating elements from dripping fat and liquids. Although this design adequately addresses the problems associated with falling debris, it fails to solve the additional problems associated with grilling in combination with a downdraft system, e.g., the production of airborne by-products associated with the grilling process, and the resulting efficiency loss created by the generation of cooling airflows.

All grilling surfaces inherently produce airborne by-products resulting from the combustion of food components. This problem is exacerbated when the grills are used indoors. For instance, airborne by-products are irritants and warrant removal from the cooking area. For that reason, downdraft fans are provided to create an air flow whereby air is drawn past the grill and ducted away from the cooking area. However, because the grill is preferably heated, at least in part, through conductive energy provided by the heating coils, the air flow created by the downdraft fans reduces the cooking efficiency, results in increased energy consumption and causes the food to cook unevenly.

The airflow which draws away the airborne by-products, also passes the exposed surfaces of the heating elements, thereby reducing their temperature. It is therefore desirable to shield the heating elements from the airflow, while maintaining contact between the heating elements and the grilling surface. Accordingly, there still exists a need in the art of cooking appliances for a grilling system which protects the heating elements from the efficiency losses caused by convective cooling, while also protecting the heating elements from dripping by-products.

SUMMARY OF THE INVENTION

The present invention is directed to a grilling grate system for cooking appliances incorporating a downdraft fan unit, wherein the grilling grate system is configured to effectively shield one or more heating elements from the air flow generated by the downdraft fan unit. More particularly, the cooking appliance is provided with a downdraft grill system including a grilling grate defining a cooking zone. The grilling grate includes an upper portion and a lower portion. The upper portion is defined by a plurality of support members that define a grilling surface and the lower portion is formed with a plurality of conductive heat members. The conductive heat members have elongated side portions which extend past leg portions of the heating element(s) in order to cloak the heating element(s) and minimize the effects of the airflow generated by the downdraft fan unit. With this arrangement, the conductive heat members are able to provide a more efficient means of energy transfer to the grilling surface.

During a cooking operation, air is drawn through slots defined in the grilling surface, whereby smoke and other air laden cooking by-products are conducted away from the cooking zone. As air is drawn through the slots, it is forced passed the leg portions of the electric heating element(s). In the past, the airflow passing the heating element(s) would lower the surface temperature of the heating element(s) through convective cooling, thereby resulting in reduced cooking efficiency. The cloaking grill grate of the present invention effectively increases the heating efficiency of the cooktop grill by protecting the electric heating element(s) from the detrimental effects of the cooling airflow produced by the downdraft system. Through the use of the present invention, as described herein, the air currents generated by the downdraft fan unit are directed around the elongated side portions of the conductive heat members, such that the side portions function to shield or cloak the leg portions of the heating element(s) from contact with the airflow, thereby minimizing the cooling effect produced by the airflow. Concurrently, the heating element(s) is protected from liquid by-products dripping thereon.

Additional objects, features and advantages of the invention will become more readily apparent from the following detailed description of a preferred embodiment, when taken in conjunction with the drawings wherein like reference numerals refer to corresponding parts in the several views.

BRIEF DESCRIPTION OF THE DRAWINGS

FIG. 2 is an enlarged cross-sectional view of the grill grate of FIG. 1; and

FIG. 3 is an enlarged, cross-sectional side view of a section of the grill grate shown extending about a leg portion of a heating element of the cooking appliance.

DETAILED DESCRIPTION OF THE INVENTION

Figure 1:
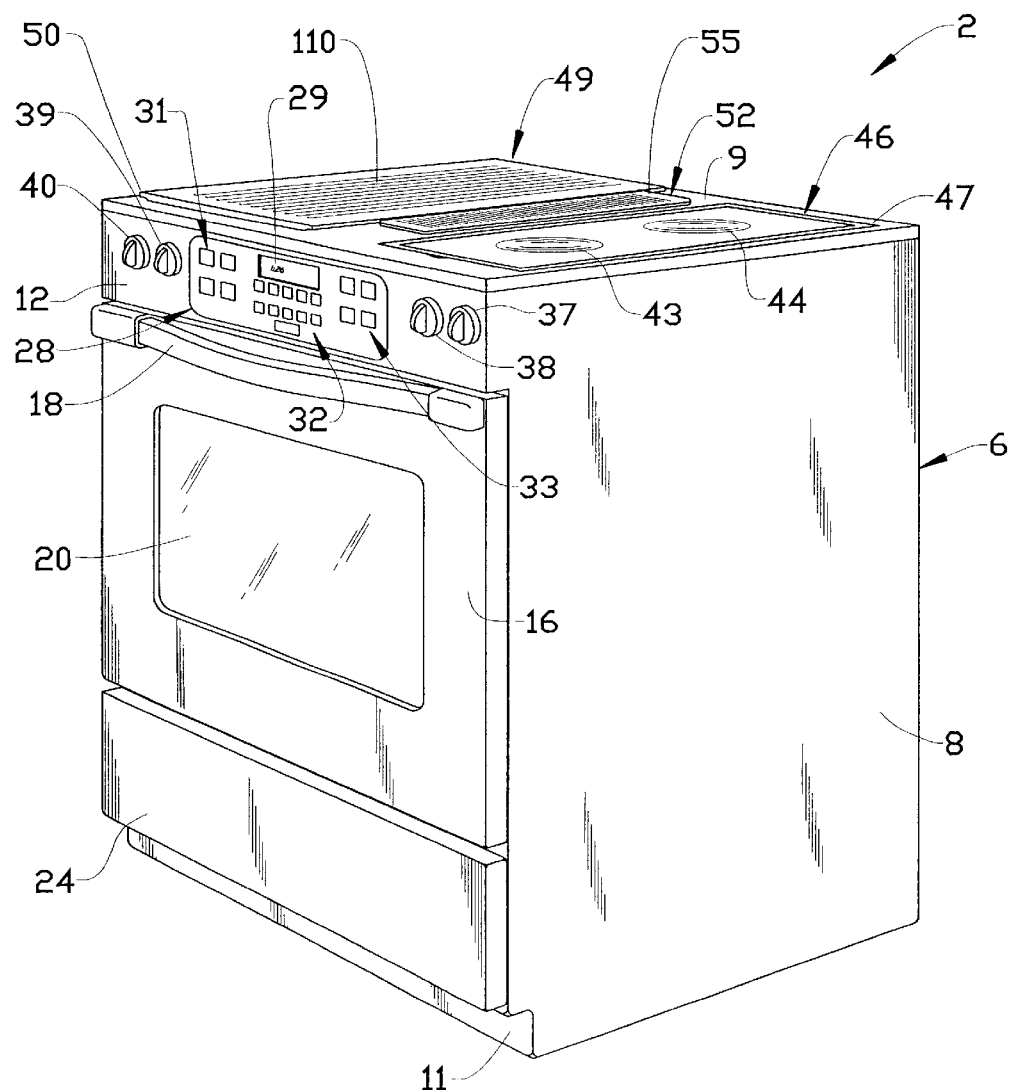
FIG. 1 is a perspective view of a preferred embodiment of the cooking appliance incorporating a heater cloaking grill grate system constructed in accordance with the present invention.

With initial reference to FIG. 1, a cooking appliance, generally indicated at 2, is shown to take the form of a range. Cooking appliance 2 includes a cabinet 6 having opposing side panels 8, a cooktop 9, a rear panel (not shown) and a front panel 11. An upper portion of front panel 11 defines a face 12 that includes a plurality of controls as will be more fully described below. Arranged below upper front face 12 is an oven door 16 having a handle 18 and a window 20. In a manner known in the art, door 16 can be pivoted to access an interior oven cavity (not separately labeled) of cooking appliance 2. Also, as shown, cooking appliance 2 includes a lower drawer 24 for use in storing pots, pans and the like.

In the embodiment illustrated, upper front face 12 is provided with a central oven control section 28 that includes a display 29 and various sets of control buttons 31–33. Although not considered part of the present invention, for the sake of completeness, control button set 31 is preferably utilized to establish a desired mode of operation for the oven of cooking appliance 2, control button set 32 represents a numeric pad including a cancel button, and control button set 33 represents program buttons for establishing desired cook times, clock settings and the like. In addition, upper front face 12 is provided with a plurality of element control knobs 37–40. In this embodiment, element control knobs 37 and 38 are utilized to control the operation of upper heating elements 43 and 44 respectively. In the embodiment shown, upper heating elements 43 and 44 are integrated into a first cartridge 46 which is adapted to be selectively placed within a first opening 47 formed in cooktop 9. As will be detailed more fully below, element control knobs 39 and 40 are utilized to control the operation of a grilling unit 49 located within a second opening 50 also formed in cooktop 9 as will be more fully described below.

Also illustrated in accordance with the preferred embodiment of the invention is a downdraft system which is generally indicated at 52 and arranged between cartridge 46 and grilling unit 49. Downdraft system 52 includes a grill 55 having a plurality of openings 60. In a manner generally known in the art, downdraft system 52 is used in combination with a blower element (not shown) to exhaust smoke and other air laden by-products when cooking on cooktop 9. The overall downdraft system 52 can be controlled through one of the buttons in central oven control section 28, or automatically whenever any one of control knobs 37–40 are placed in an activated state. In general, with the exception of the construction of the grilling unit 49 and its manner of operation in connection with downdraft system 52, the construction and operation of cooking appliance 2 is known in the art. Therefore, additional details of the general construction and operation of cooking appliance 2 will not be provided here. Instead, reference will now be made specifically to FIGS. 2 and 3 in describing a preferred construction and operation of grilling unit 49.

As shown, grilling unit 49 is defined by a base portion 65 located within second opening 50. Situated upon base portion 65 are a plurality of laterally extending and fore-to-aft spaced support rails 85, each having an upper cross portion 86 and spaced support leg portions 87. The upper cross portion 86 of each support member 85 includes a plurality of arcuate notches 89 adapted to receive portion of a respective heating element 90 of grilling unit 48. In the most preferred embodiment, two heating elements 90, each preferably constituted by an electric, sheathed, resistance-type element having a set of electrical connecting prongs (not shown) adapted to engage a receptacle (also not shown) provided within second opening 50. Of course, it should be recognized that an enlarged, single heating element could be equally employed.

As shown, each heating element 90 extends in a generally serpentine path, with a plurality of generally parallel leg portions 92 and curved leg portions 93 adapted to act as a conductive heat source for a grill member in the form of a grate 105. As will be discussed more fully below, grill member 105 is defined by a plurality of support members 112, separated by a series of openings or slots 113 and joined by a peripheral portion 114. As shown, peripheral portion 114 includes an outermost lip 115 adapted to engage cooktop 9.

As shown in FIG. 3, each support member 112 is defined by an upper portion 118, opposing sloped portions 120, and side portions 125 having spaced lower extension portions 126. With this construction, each support member 112 defines an elongated channel 128 that preferably traverses a major portion of the length of support member 112 and is adapted to receive one of the plurality of leg portions 92 of heating element 90. More specifically, each leg portion 92 fits into a respective channel 128 such that only a small air gap 129, preferably in the order of 1/16" or less, is defined between the heating element 90 and channel 128 as shown. Alternatively, air gap 129 can be avoided, with heating element 90 directly abutting the entire channel 128.

In accordance with the most preferred form of the invention, each extension portion 126 is adapted to extend substantially past the midpoint of the cross-sectional area of leg portion 90, i.e., a substantial distance below a central, longitudinal axis of leg portion 90. Although the lower extension portion 126 is generally shown as a semi-hemispherical channel, it is further contemplated that the channel can take whatever shape is required to follow an outer contour of any particularly shaped heating element. Of course, at this point, it should be realized that accommodations must be made for curved leg portions 93 of each heating element 90. In accordance with the invention, each support member 112 is void of any lower extension portions 126 at curved leg portions 93 of heating element 90. This configuration is not considered problematic as substantially all of the air developed by downdraft system 52 is generated at a position spaced from the fore-to-aft portions of heating element 90. In addition, it is commonplace to cook food items in a more central location. However, it is also contemplated that support elements 112 can take a fully conforming serpentine path as well.

During use, each heating element 90 is energized via an associated control knob 39, 40 to cause electricity to flow through the resistive coils causing the temperature of the heating element 90 to rise substantially. The resultant heat energy is transmitted from heating element 90, via air gap 129, to support member 112 and conducted to upper portion 118 thereof. Once the temperature of upper portion 118 has reached its desired level, a cooking process is initiated by placing an item of food, either directly or upon another cooking surface, onto upper portion 118 of grill member 105.

Once the cooking process starts, airborne by-products will inherently begin to emanate from the food item placed upon grill member 105. To mitigate the impact of the airborne by-products on the surrounding area, the downdraft system 52 is operated, either separately or as part of the grill control as discussed above, whereby an airflow is created which circulates past heating element 90 below grill member 105, up through slots 113, over grill member 105 and into openings 60 of grill 55. The airborne by-products will inherently be drawn away with this air flow. As should be readily understood, openings 60 lead to an exhaust plenum (not shown).

While the downdraft system 52 does provide the benefit of removing harmful smoke and other airborne by-products from the cooking area, this benefit is not derived without cost. More specifically, the airflow created by the downdraft system 52 has the tendency to lower the efficiency of grilling unit 49 by lowering the temperature of both grill member 105 and heating element 90. This efficiency loss is minimized by the application of the current invention. As described above, heating element 90 resides with channel 128 formed on the conducting, lower extension portions 126 of support members 112. As the air is drawn past heating element 90, lower extension portions 126 surround and cloak leg portions 92 of heating element 90 thereby minimizing their exposure to the cooling effects of the airflow, particularly given that the airflow is directed laterally, substantially perpendicular to cloaking or extension portions 126 and then up through openings 60 which are defined between respective side portions 125. In this manner, the heating efficiency of heating element 90 is increased, resulting in lower energy consumption and faster cooking times. In addition, support members 112 further prevent liquid by-products from flowing through slots 113 and onto heating element 90, which would substantially increase at least the amount of smoke developed.

Although described with respect to a preferred embodiment of the present invention, it should be readily apparent that various changes and/or modifications can be made to the invention without departing from the spirit thereof. For example, although grilling unit 49 is described as a replaceable cartridge, it is understood that grilling unit 49 may be provided as an integral part of cooktop 9. In general, the invention is only intended to be limited by the scope of the following claims.

We claim:

1. A cooking appliance comprising:
   a cooktop having an upper surface;
   a downdraft system including a grill arranged on the upper surface of the cooktop, said grill including a plurality of intake openings into which are adapted to be drawn cooking by-products by an airflow created during operation of the downdraft system; and
   a grilling unit mounted in the cooktop, said grilling unit including at least one electric heating element having a plurality of leg portions extending throughout a heating zone, at least one support element for suspending the at least one electric heating element directly adjacent to and spaced by a small air gap from said grill, and a grilling grate positioned over said at least one heating element, said grilling grate including an outer peripheral portion and an inner portion including a plurality of support members separated by a series of openings and joined by the outer peripheral portion with the openings leading to the at least one electric heating element, each of said support members including a plurality of downwardly projecting channel defining elements, said channel defining elements extending along the leg portions of the at least one electric heating element wherein, during operation of the cooking appliance, the channel defining elements cloak the leg portions of the at least one electric heating element from the airflow created during operation of the downdraft system to minimize convective heat losses.

2. The cooking appliance of claim 1, wherein the grilling unit is constituted by a replaceable cartridge adapted to be integrated into the cooktop.

3. The cooking appliance of claim 1, wherein the grilling grate is suspended above the at least one heating element.

4. The cooking appliance of claim 3, wherein the at least one heating element is substantially, uniformly spaced from the channel defining elements, with only the small air gap therebetween.

5. The cooking appliance of claim 4, wherein the extended leg portions project a substantial distance below a central, longitudinal axis of the at least one heating element.

6. The cooking appliance of claim 5, wherein both the leg portions of the at least one heating element and the channel defining elements extend substantially perpendicular to at least a portion of the airflow.

7. The cooking appliance of claim 1, wherein the series of openings in the grilling grate are defined between respective ones of the channel defining elements.

8. The cooking appliance of claim 1, wherein both the leg portions of the at least one heating element and the channel defining elements extend substantially perpendicular to at least a portion of the airflow.

9. A cooking appliance comprising:
   a cooktop having an upper surface;
   a downdraft system including a grill mounted in the upper surface of the cooktop, said grill including a plurality of intake openings into which are adapted to be drawn cooking by-products by an airflow created during operation of the downdraft system; and
   a grilling unit mounted in the cooktop, said grilling unit including at least one electric heating element having a plurality of leg portions extending throughout a heating zone, at least one support element for suspending the at least one electric heating element directly adjacent to said grill, and a grilling grate positioned over said at least one heating element, said grilling grate including means for cloaking said at least one heating element from the airflow created during operation of the downdraft system to minimize convective heat losses, said at least one heating element being spaced from the cloaking means by a small air gap.

10. The cooking appliance of claim 9, wherein said cloaking means includes an outer peripheral portion and an inner portion including a plurality of support members separated by a series of openings and joined by the outer peripheral portion, with the openings leading to the at least one electric heating element, each of said plurality of support members including a plurality of downwardly projecting channel defining elements, said channel defining elements extending along the leg portions of the at least one electric heating element wherein, during operation of the cooking appliance, the channel defining elements cloak the leg portions of the at least one electric heating element.

11. The cooking appliance of claim 9, wherein the grilling unit is constituted by a replaceable cartridge adapted to be integrated into the cooktop.

12. The cooking appliance of claim 9, wherein the grilling grate is suspended above the at least one heating element.

13. The cooking appliance of claim 12, wherein the at least one heating element is substantially, uniformly spaced from the channel defining elements, with only the small air gap therebetween.

14. The cooking appliance of claim 13, wherein the extended leg portions project a substantial distance below a central, longitudinal axis of the at least one heating element.

15. The cooking appliance of claim 9, wherein said cloaking means extends substantially perpendicular to at least a portion of the airflow.

16. The cooking appliance of claim 15, wherein said grilling grate includes an upper surface provided with a plurality of openings for the airflow, each of said openings being defined between respective sections of said cloaking means.

17. A method of shielding a heating element from an airflow created by a downdraft system provided to remove cooking by-products generated by cooking food on a grilling surface defined by a grate of a grilling unit arranged above the heating element comprising:
   creating an airflow which flows from beneath the grate, passed the heating element, through openings provided in the grilling surface and into the downdraft system; and cloaking the heating element from the airflow through cloaking structure to minimize convective heat losses while maintaining a small air gap between the heating element and the cloaking structure.

18. The method of claim 17, wherein the heating element is cloaked by positioning downwardly extending channel defining elements about leg portions of said heating element.

19. The method of claim 18, further comprising: directing at least a portion of the airflow generally perpendicular to both the leg portions of said heating element and the channel defining elements.

20. The method of claim 19, further comprising: guiding the airflow through the openings in the grilling surface between respective ones of the channel defining elements.

* * * * *